Feb. 7, 1928.
F. A. WERNIG
AUTOMOBILE BUMPER
Filed Oct. 26, 1925   2 Sheets-Sheet 1
1,658,111
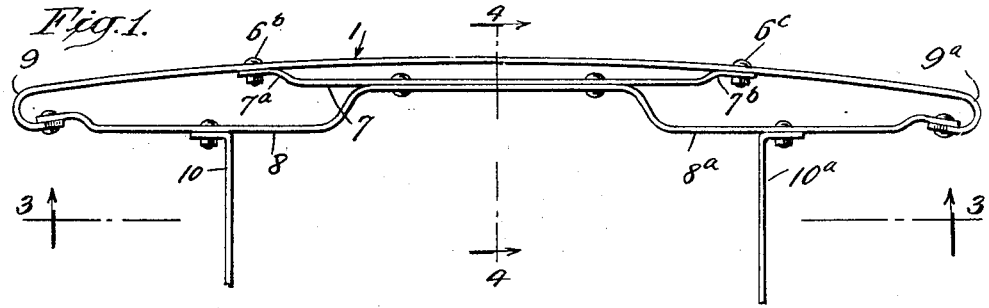
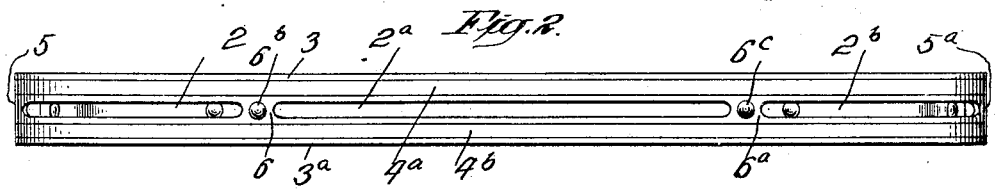
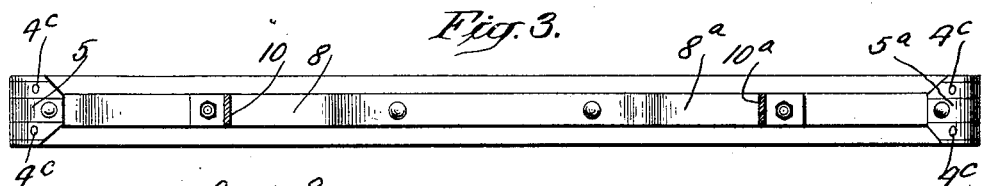
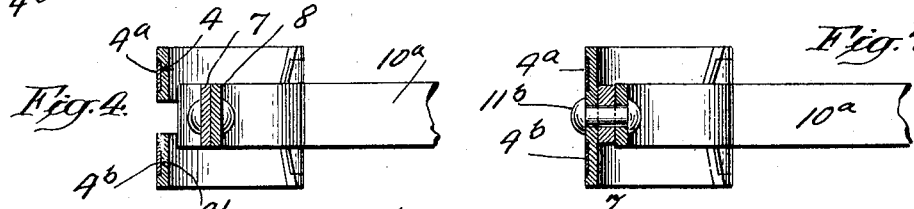
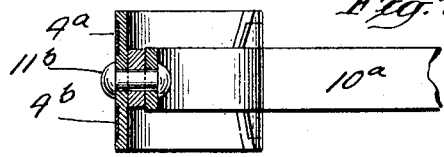
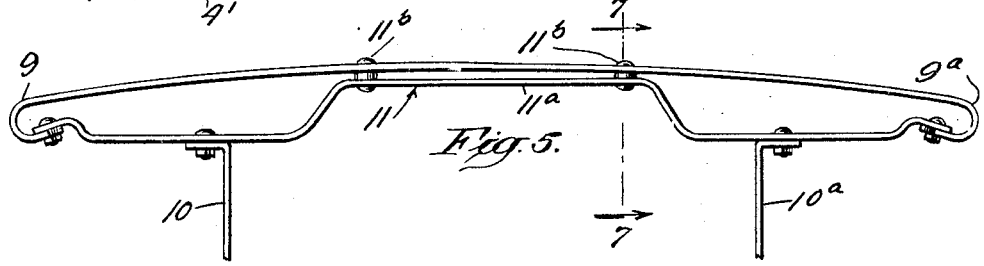
INVENTOR
FREDERICK A. WERNIG
BY
Joseph F. O'Brien
ATTORNEY Feb. 7, 1928.
F. A. WERNIG
1,658,111
AUTOMOBILE BUMPER
Filed Oct. 26, 1925  2 Sheets-Sheet 2
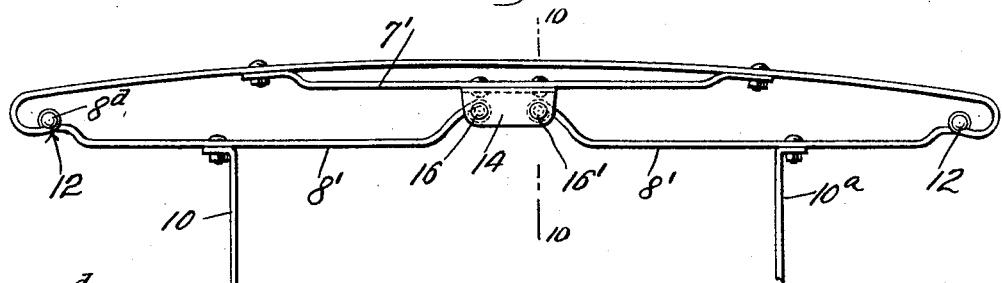
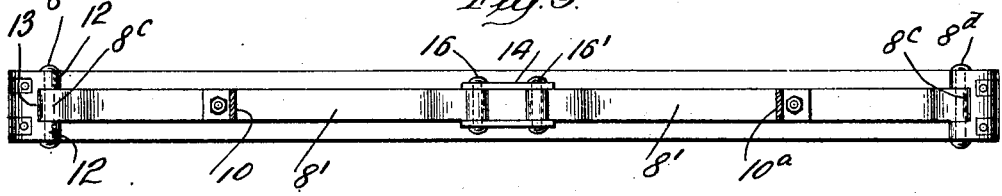
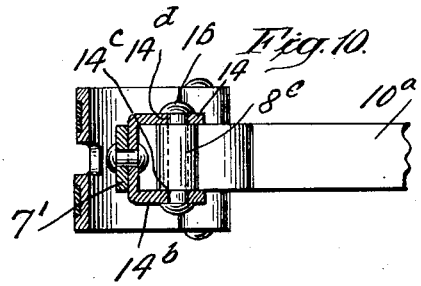
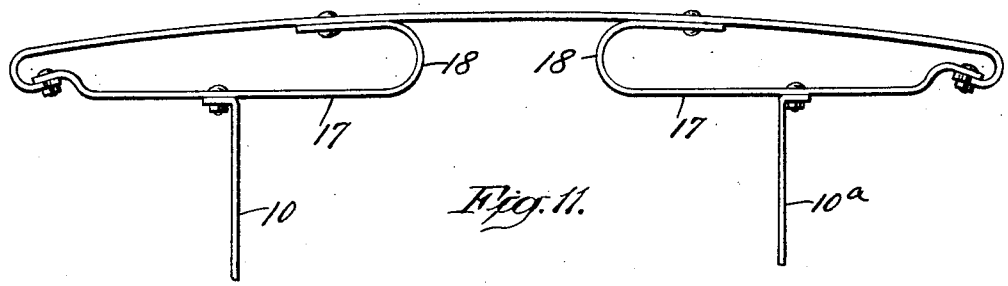
INVENTOR
FREDERICK A. WERNIG
BY
ATTORNEY Patented Feb. 7, 1928.

1,658,111

UNITED STATES PATENT OFFICE.

FREDERICK A. WERNIG, OF BROOKLYN, NEW YORK, ASSIGNOR TO NEW YORK WIRE & SPRING COMPANY, A CORPORATION OF NEW JERSEY.

AUTOMOBILE BUMPER.

Application filed October 26, 1925. Serial No. 64,715.

This invention relates to improvements in automobile bumpers.

One of the objects of this invention is to produce an automobile bumper of the extended area type which will have increased inherent shock-cushioning properties combined with great strength and durability; another object is to produce a bumper of extended area spring-bar type which will be composed of a minimum number of parts, have a low cost of manufacture and avoid loosely jointed parts to eliminate rattling therefrom; still another object is to produce from a single bar of resilient metal, such as spring steel, an impact member which will not only be inherently strong, durable and resilient so as to afford shock-absorbing properties but will also be extremely neat and ornamental in appearance and will produce an effect similar to but more ornamental than the double or parallel bar bumper; another object of this invention is to provide a bumper which will be capable of effectively cushioning or absorbing shocks of a wide range of intensities varying from the very light shocks encountered frequently in heavy traffic to violent head-on collisions and to this end to combine a spring bar impact member having increased inherent shock-cushioning properties with a spring rear bar in such a way as to reinforce the mid-section of the impact member while leaving it free so as not to substantially detract from its resilience and consequent capability of properly absorbing relatively light shocks and at the same time to provide such a secondary cushioning effect for heavy shocks striking said mid-section as will effectively resist excessive bending and permanent setting of the impact member; another object is to increase the shock-absorbing or cushioning properties of an auxiliary reinforcing member for the central portion of the impact member by connecting the inner ends of the rear bars to a portion intermediate the ends of the auxiliary or reinforcing bar so as to provide at each end of the bumper mid-section a pair of reversely-extending shock-cushioning arms, thus forming a secondary cushioning or pressure-resisting system which while effectively cushioning light shocks will prevent collapsing or permanent setting of said impact member under heavy collisions; still another object of this invention is to provide an arrangement in which the rear bars, including the spring reinforcing bar are of relatively narrow vertical width and are mounted along the median line of an impact member of said extended area type and is fastened at its opposite ends thereto to provide a secondary cushioning or pressure resisting member and a resilient fastening element at the center of the impact member for the ends of the rear bars; still another object of the invention is to produce a construction in which rear bars may be pivotally connected to the opposite ends of an impact bar of the type specified and may also be pivotally connected to the combined reinforcing and shock-cushioning bar.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a bumper embodying my invention;

Fig. 2 is a front elevation of the bumper shown in Fig. 1;

Fig. 3 is a section on the line 3—3 of Fig. 1 looking in the direction of the arrow;

Fig. 4 is a section on the line 4—4 of Fig. 1;

Fig. 5 is a plan view of a modified form of my invention;

Fig. 6 is a front elevation of the bumper shown in Fig. 5;

Fig. 7 is a section on the line 7—7 of Fig. 5;

Fig. 8 is a plan view of another modified form of my invention in which the rear bar is pivotally connected to the impact member and auxiliary bar;

Fig. 9 is a rear elevation of the bumper showing the attaching bars in section;

Fig. 10 is a section on the line 10—10 of Fig. 8; and

Fig. 11 is a plan view of another modified form of the bumper embodying my invention.

Referring now to these drawings and particularly to Figs. 1 to 4 thereof, 1 indicates an impact bar comprising a resilient metal bar and preferably a spring steel bar of a thickness corresponding to the conventional spring-steeel impact bar and of a length which will cause it to extend transversely across the chassis and wheels of an automobile. Said impact member 1 is formed of a single bar of such resilient metal of an extended vertical width substantially equal to the usual double-bar bumper and is provided along its horizontal median line between the upper and lower edges thereof with a plurality and preferably three elongated openings or slots 2, $2^a$ and $2^b$. These openings 2, $2^a$ and $2^b$ separate the single piece of material into parallel upper and lower bar sections or portions 3, $3^a$ and also provide integral end connecting or strut portions 5, $5^a$ and intermediate integral strut portions 6, $6^a$. The bar sections 3, $3^a$ are provided on the front face thereof with grooves 4, $4'$ preferably having thin strips $4^a$ and $4^b$ of plated metal inlaid or fitted and fastened therein by rivets $4^c$ so as to produce an ornamental effect.

The opening $2^a$ is, as shown, arranged at the mid-section of the impact bar and the struts 6, $6^a$ are positioned midway between the center of the bar and the opposite ends thereof.

In the preferred embodiment of my invention an auxiliary bar 7 of relatively narrow or single-bar width is mounted at the rear of the impact member 1 along the horizontal median line thereof and is spaced therefrom and fastened to said impact member at the strut portions 6, $6^a$ by bolts $6^b$, $6^c$. A single rear bar is provided with offset end portions 8, $8^a$ also of single bar width and is likewise disposed along the median line of the impact bar. Each offset end portion has an end connected to the said impact member 1, and the other end of each of said offset end portions 8, $8^a$ has a connection with the said auxiliary reinforcing bar 7 intermediate the ends thereof. The ends $7^a$, $7^b$ of said reinforcing auxiliary bar extend forwardly and outwardly from the rear offset end portions and are fastened by said bolts $6^b$, $6^c$ to the impact member at said strut portions 6, $6^a$.

Said impact bar is preferably slightly bowed from end to end and has at opposite ends loops 9, $9^a$ to the ends of which loops the rear offset ends 8, $8^a$ are, as aforesaid, connected. The rear supporting bars are connected to the automobile chassis in the usual manner by supporting bracket bars 10, $10^a$ fastened to said chassis in any suitable way such as by bolts or screws not shown.

It will be seen that in this construction of bumper, the impact member will not only be greatly reinforced and the cushioning effect greatly increased at the mid-section so as to prevent a permanent setting thereof in case of a violent collision but the inherent resilience which is necessary to properly cushion light shocks will not be materially affected because of the arrangement of the members through which such increased cushioning effect is obtained. Thus shocks striking the impact member at the mid-section will first be resisted by the inherent spring of the impact member. If the shock is greater than can be properly cushioned by said impact member alone, it will then be resisted first by the outwardly bent arms of the reinforcing member and then by the flat bar portion. If the shock is still not fully absorbed it will then be further resisted by the back bars.

In Figs. 5 to 7, I have shown a modified form of my invention, in which, instead of the auxiliary bar 7, the rear supporting bar 11 is provided with an integral shock cushioning portion $11^a$ arranged at the mid-section of and spaced from the impact member 1. The ends of the cushioning portion $11^a$ are connected to the impact member at the strut portions 6, $6^a$ in a manner similar to the connection of the auxiliary bar 7 in Figs. 1 to 4 above specified. The spacing of the cushioning portion $11^a$ of the rear bar enables the impact bar to maintain its resilience at the mid-section and also produces a cushioning effect though not of the same degree as the use of the auxiliary bar shown in Figs. 1 to 4. In other respects, the modified form shown in Figs. 5 to 7 is substantially similar to the construction shown in Figs. 1 to 4.

In Figs. 8 to 10, I have shown another modified form of my invention in which an auxiliary reinforcing bar $7'$ is mounted on and fastened to the impact member in all respects similar to the bar 7 hereinabove described in relation to Figs. 1 to 4. Said bar $7'$ is, however, pivotally connected intermediate its ends to ends of two rear bars $8'$ which are also pivotally connected at their opposite ends to the ends of the impact member. The auxiliary bar $7'$ is arranged at the rear of the impact member along the horizontal median line in substantially the same relationship as shown in Figs. 1 to 4. As illustrated, the opposite ends of the impact member are looped similarly to those shown in said other figures and each of said ends is then provided with knuckle-joints comprising a pair of eyes 12 and a notch 13 between such eyes. An end of each of the supporting bars $8'$ is similarly provided with an eye $8^e$ and arranged in the said notch between the knuckle-joints or eyes and a king-bolt $8^d$ is slipped through the three eyes to retain the parts together at each end. The auxiliary bar is connected to the rear bars at its middle portion and for this purpose a pivot plate in the form of a short channel 14 is mounted, as shown, by rivets at the middle of said bar 7'. The horizontal flanges 14ᵇ of the channel 14 have pairs of registering holes 14ᶜ, 14ᵈ. The opposite ends of the rear bars 8' are provided with eyes 8ᵉ fitting between the flanges of said channel bar and king bolts 16, 16' are passed through said registering holes to pivotally connect the bars together.

In Fig. 11, I have shown another modified form of my invention in which the impact member 1 is in all respects similar to that shown in Figs. 1 to 4 but in which double rear supporting bars 17 have reversed turns or loops 18 adjacent to the center of the impact member, the ends of which reversed loops 18 are connected to the impact bar at the said intermediate strut portions, thus reinforcing the impact bar at the sections thereof at opposite sides of the middle thereof and in which the said strut portions are positioned or located.

Having described my invention, I claim—

1. An automobile bumper embodying, in combination, an impact member of increased vertical width comprising a single bar of spring metal having in its front face a plurality of parallel grooves and thin ornamental strips of metal of contrasting color inlaid within said grooves and fastened to said impact member to simulate a plurality of separated parallel bars.

2. An automobile bumper embodying, in combination, an impact member of increased vertical width comprising a single bar of spring metal having between its upper and lower edges a plurality of elongated openings separating the major portion of the impact member into upper and lower bar-sections simulating in appearance twin parallel spaced bars, grooves in the front faces of each such upper and lower bar-sections and a pair of thin strips of a metal of contrasting color inlaid within said grooves and fastened to said impact member.

3. An automobile bumper embodying, in combination, an impact member of increased vertical width comprising a single bar of spring metal provided at opposite ends with integral resilient loops and having between its upper and lower edges a plurality of elongated openings separating the major portion of the impact member into upper and lower bar-sections simulating in appearance twin parallel spaced bars.

4. An automobile bumper embodying, in combination, an impact member of increased vertical width comprising a single relatively wide bar of spring metal provided at opposite ends with integral resilient loops and having between its upper and lower edges a plurality of elongated openings separating the major portion of the impact member into upper and lower bar-sections simulating in appearance twin parallel spaced bars, and relatively rigid rear-bar portions connected adjacent to the ends of said integral resilient loops.

5. An automobile bumper embodying, in combination, an impact member of increased vertical width comprising a single bar of spring metal provided at opposite ends with integral resilient loops and having between its upper and lower edges a plurality of elongated openings separating the major portion of the impact member into upper and lower bar-sections simulating in appearance twin parallel spaced bars, grooves in the front faces of each of such upper and lower bar-sections and a pair of thin strips of a metal of contrasting color inlaid within said grooves and fastened to said impact member.

6. An automobile bumper embodying, in combination, an impact member of increased vertical width comprising a single bar of spring metal provided at opposite ends with integral resilient loops and having between its upper and lower edges a plurality of elongated openings separating the major portion of the impact member into upper and lower double-bar sections simulating in appearance twin parallel spaced bars, said openings being arranged to provide integral strut portions connecting the upper and lower bar-sections and positioned between the center of the impact member and the opposite ends thereof, and rear bars of single-bar width connected to said strut portions.

7. An automobile bumper embodying, in combination, an impact member of increased vertical width comprising a single bar of spring metal provided at opposite ends with integral resilient loops and having between its upper and lower edges a plurality of elongated openings separating the major portion of the impact member into upper and lower double-bar sections simulating in appearance twin parallel spaced bars, said openings being arranged to provide integral strut portions connecting the upper and lower bar-sections and positioned between the center of the impact member and the opposite ends, said bar sections having grooves in the front face thereof and thin strips of metal fitted within said grooves, and rear bars of single-bar width connected to said strut portions.

8. An automobile bumper embodying, in combination, an impact member of increased vertical width comprising a single bar of spring steel provided at opposite ends with integral resilient loops and having between its upper and lower edges a series of elongated openings along the horizontal median line of the bar, said openings being arranged to provide integral strut portions connecting the upper and lower bar sections and positioned at opposite sides of the center of said impact member, an auxiliary reinforcing member extending horizontally along the mid-section of the impact member and having its opposite ends fastened to said strut portions at the opposite ends of said opening and a rear-bar member connected to the end loops of the impact member and to said auxiliary reinforcing member.

9. An automobile bumper embodying, in combination, an impact member comprising a single bar of spring steel provided at opposite ends with integral resilient loops and having between its upper and lower edges a series of elongated openings along the horizontal median line of the bar, said openings being arranged to provide integral strut portions connecting the upper and lower bar sections and positioned at opposite sides of the center of said impact member, an auxiliary reinforcing member extending horizontally along the mid-section of the impact member and having its opposite ends fastened to said strut portions and a pair of rear bars having pivotal connection with the end loops of the impact member and with said auxiliary reinforcing member.

In witness whereof, I have signed my name to the foregoing specification.

FREDERICK A. WERNIG.